INVENTOR.
HARRY R. HOFFERBERTH
BY
Jerome P. Bloom
HIS ATTORNEY

LAMINATING AND BONDING APPARATUS

Filed July 5, 1960 3 Sheets-Sheet 2

INVENTOR.
HARRY R. HOFFERBERTH
BY Jerome P. Bloom
HIS ATTORNEY

Nov. 26, 1963 H. R. HOFFERBERTH 3,111,893

LAMINATING AND BONDING APPARATUS

Filed July 5, 1960 3 Sheets-Sheet 3

INVENTOR.
HARRY R. HOFFERBERTH
BY Jerome P. Bloom
HIS ATTORNEY

United States Patent Office 3,111,893
Patented Nov. 26, 1963

3,111,893

LAMINATING AND BONDING APPARATUS

Harry R. Hofferberth, Centerville, Ohio, assignor to Harry E. Hofferberth, Dayton, Ohio Filed July 5, 1960, Ser. No. 40,645
11 Claims. (Cl. 100—93)

This invention relates to laminating apparatus particularly advantageous for fabricating printing plates and will be so described. However, though the invention is disclosed in a limited sense, it should nevertheless be obvious therefrom that the form and application of invention embodiments are not so limited and such is not intended.

The preparation of printing plates has heretofore been an involved process. The usual plate consists of a thin metal printing shell most commonly reinforced by a backing of lead or its equivalent. This conventional plate has been found to have many objectionable characteristics. Its backing has a tendency to deform under load which tends to reduce its printing efficiency. Also, a printing plate is normally quite heavy in proportion to its size and therefore difficult to handle. Moreover, the application and preparation of a conventional backing for a printing plate is an expensive and time consuming process.

With the above in mind, a process was recently developed which has made it possible to apply a plastic backing to a printing shell to thereby provide a more durable printing plate which is lighter in weight, easier to handle and more satisfactory in use than the conventional plate. However, difficulty has been experienced in developing machinery capable of utilizing the new process to optimum advantage. For example, proposed machinery has been either so complex as to create maintenance problems or so fabricated as to be generally incapable of use for mass production. The present invention overcomes the difficulties previously encountered in efforts to utilize this new process in the production of printing plates.

In a preferred form the invention provides apparatus enabling efficent mass production of plastic backed printing plates having improved load and shock accommodating characteristics. The apparatus so provided offers ease of maintenance, affording complete accessibility to its working parts. This enables the apparatus to be kept in a continuously clean condition which is essential for protection of the printing shells applied therein. Printing plates fabricated in the invention apparatus will produce better and sharper print and have a longer and a more effective operating life. Further, in a broader sense, the invention provides improved apparatus for bonding laminations of metal and plastic which incorporates many safety features insuring optimum results at minimum cost. The work cycle of the invention apparatus is completely automatic and minimizes labor in attendance.

A primary object of the invention is to provide apparatus for laminating and bonding plastic to metal which may be economically manufactured, more efficient and satisfactory in use, adaptable to a wide variety of applications and easily maintained.

A further object of the invention is to provide improved apparatus for bonding laminations of plastic to printing shells and the like which is capable of automatic operation.

Another object of the invention is to provide apparatus enabling mass production of durable, lightweight printing plates.

An additional object of the invention is to provide automatic means for bonding a uniform thin layer of plastic to the back of a printing shell which reduces "make ready" time for printing plates to a minimum.

Another object of the invention is to provide improved apparatus for effecting bonded laminations of plastic and metal.

A further object of the invention is to provide apparatus for bonding plastic to metal having improved cyclic operation and safety features rendering it capable of providing maximum efficiency in use.

Another object of the invention is to provide apparatus for bonding laminations of plastic to metal, particularly advantageous in the production of printing plates, possessing the advantageous structural features, the inherent meritorious characteristics and the means and mode of operation herein described.

With the above primary and other incidental objects in view which will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein a preferred but not necessarily the only form of embodiment of the invention is generally schematically shown, FIG. 1 is a perspective view of an invention embodiment;

FIG. 6 is a schematic of the electrical circuit employed; and

Figures 1, 2:
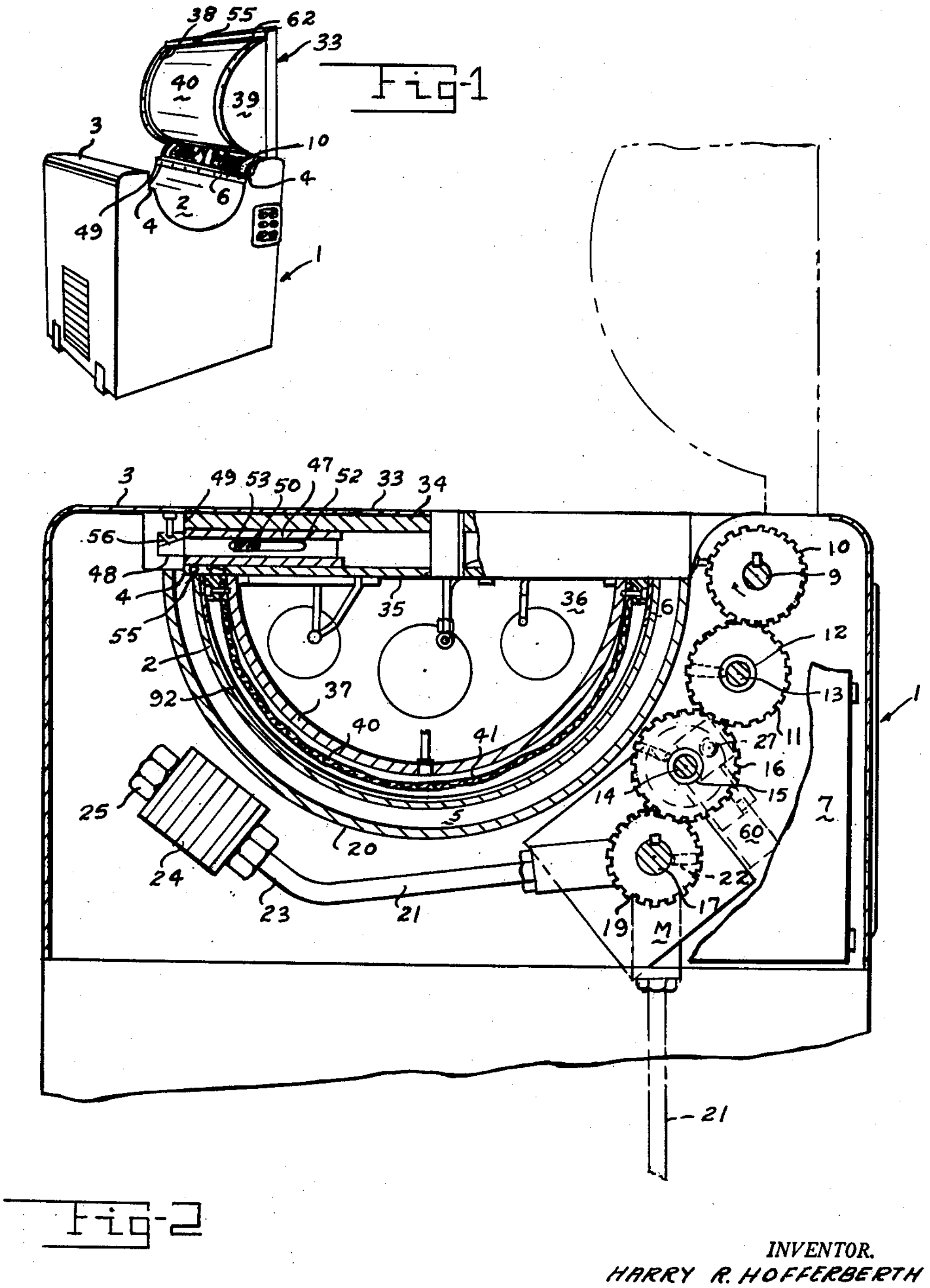
FIG. 2 is a partial end view of the invention apparatus, with parts broken away for clarity of disclosure.
Figure 3:
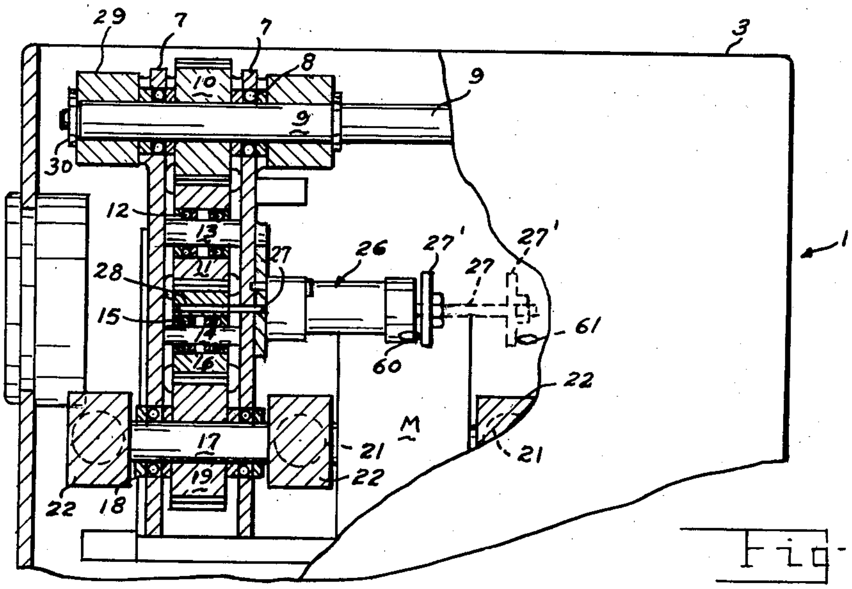
FIG. 3 is a partial side elevation of the apparatus of FIG. 1, with parts broken away for clarity of disclosure.
Figure 4:
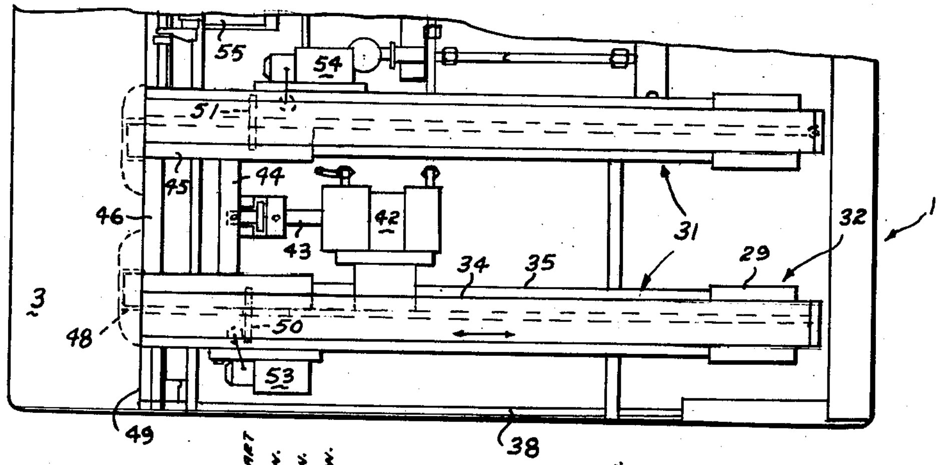
FIG. 4 is a fragmentary top view of the structure of FIG. 1 with its cover plate removed.
Figure 5:
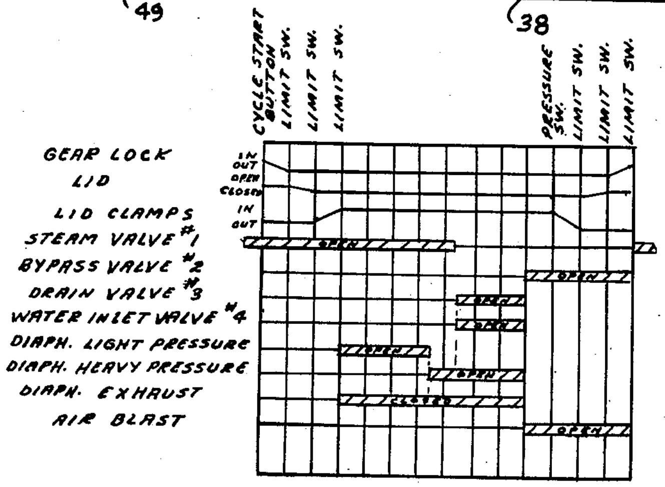
FIG. 5 is a chart illustrating the operating cycle of the invention apparatus illustrated.

The invention can be best described with particular reference to the accompanying drawings. As shown, a housing 1 is provided having a recessed cavity 2 of semi-cylindrical configuration longitudinally of its upper surface 3. The recessed cavity 2 is defined by shoulders 4 at its lateral extremities spaced inwardly from and generally parallel to the surface 3. The cavity 2 and shoulders 4 are defined by the upper surface portions of a double walled steam jacket 5 fixed in the housing 1. The jacket 5 is semi-circular in cross-section as may be readily observed from the drawings.

Fixed to the lateral extremities of the arcuately contoured upper surface of the jacket 5, adjacent the shoulders 4, are plate locating strips 6 which are bridged to one end by a similar semi-circular strip fixed transversely of the jacket 5. The strips 6 thus define a shallow tray at the upper surface of jacket 5 which is open to one end to slidably receive a nesting tray including a printing shell having its rear surface uppermost. This will be further described.

Pairs of spaced parallel standards 7 are suitably fixed in housing 1, respectively adjacent either end, to extend vertically thereof and to one side of the jacket 5. The standards 7 are in laterally aligned relation and have aligned apertures in their upper ends defined by laterally projected hubs respectively accommodating bearings 8. The bearings 8 rotatably mount a shaft 9. The shaft 9 extends from adjacent one end of the housing 1 to the other and its central axis lies in a plane immediately above and parallel to the plane defined by the shoulders 4.

Confined on shaft 9 between each pair of standards 7 is a gear 10. Idler gears 11 vertically below and coplanar with gears 10 mesh therewith. The gears 11 respectively mount on roller bearings 12 on shafts 13 which bridge the respective pairs of standards 7. The shafts 13 are axially aligned and parallel to the shaft 9. Shafts 14, similar to shafts 13, are fixed between the respective pairs of standards 7 vertically below the shafts 13 and parallel thereto. Roller bearings 15 about shafts 14 rotatably mount idler gears 16 which respectively mesh with gears 11. A further shaft 17 extends from one end of housing 1 to the other through bearings 18 in axially aligned apertures in the standards 7. The shaft 17 is spaced below the shafts 14 and parallel thereto. A pair of gears 19 are fixed to shaft 17, respectively confined between the respective pairs of standards 7 and in mesh with the respective idler gears 16. Thus, shafts 9, 13, 14 and 17 are parallel and, viewing FIG. 2 of the drawings, are generally arcuately disposed about and in spaced relation to the arcuate undersurface 20 of steam jacket 5. The spacing of the shafts from the surface 20 slightly increases from the upper to the lower thereof.

An air motor M is positioned between and longitudinally spaced from respective pairs of standards 7. Its drive shaft is represented by the shaft 17 which includes axial extensions thereof. It can be thus seen that energizing motor M results in drive of shaft 17 and thereby of shaft 9 through idlers 11 and 16 with essentially no friction to impair the drive efficiency.

Immediately to either side of each pair of standards 7 is a counterweight arm 21, one end 22 of which is annular and accommodates shaft 17 therethrough to which it is keyed. Set screws 22′ fix the arms 21 against movement longitudinally of the shaft 17. The arms 21 project generally radially from shaft 17 below the jacket 5 and have their outer ends 23 mutually inclined upwardly from a radial direction. The ends 23 of arms 21 are threaded to respectively mount annular weights 24 thereabout confined between lock nuts 25.

An air cylinder 26 positioned between the respective pairs of standards 7 is fixed to project at right angles to the outer face of one standard 7 to one side of an idler 16. The cylinder 26 contains a piston having a rod 27 connected to axially project through either end thereof. One end of rod 27 extends through an aperture in the standard 7 to which the cylinder 26 mounts while its other end has a plate 27′ fixed thereto externally of the cylinder. The idler 16 adjacent the cylinder 26 has an aperture 28 transversely therethrough adapted to axially align with rod 27. By actuation of suitable controls, to be described, the rod 27 can be selectively projected through aperture 28 as it aligns therewith. This will lock gear 16 and prevent drive from shaft 17 to the shaft 9. The plate 27′ moves with rod 27 between limit switches 60 and 61 as rod 27 is selectively projected and retracted, as and for purposes to be further described.

Sleeves 29 are fixed on shaft 9 to either side of each pair of standards 7 immediately adjacent the bearings 8. Plates 30 fixed to shaft 9 confine the sleeves 29 against lateral displacement.

Each sleeve 29 mounts one end of an I-beam 31 which is welded to extend in a sense tangential to its upper surface. The beams 31 are so disposed to have their upper and lower flange portions 34 and 35 respectively coplanar. It should be noted in the drawings that the upper flange 34 of each beam is narrower than its lower flange 35.

The beams 31 and their integral members 29 fixed to shaft 9 define hinge members 32 adapted to transversely bridge the cavity 2 in a horizontally projected condition. A rectangular cap plate 33 fixed over the upper flanges 34 of beams 31 has dependent portions to the projected extremities of beams 31 and spaced laterally thereof to thereby form a lid for cavity 2 forming a continuation of surface 3 in a horizontal position.

A semi-circular gusset 36 is fixed longitudinally of and depends vertically from the base 35 of each beam 31. The gussets 36 are thereby oriented in parallel relation to depend in a sense transversely of the lid. The diametral portions of the gussets are shorter than the beams 31 and similarly spaced from their ends.

A framework 38 fixed to the bottom of the lid formed by cap 33 mounts semi-circular plates 39 to either end, parallel to gussets 36 and of a diameter to bridge cavity 2 and substantially close it to either end with cap 33 in a horizontally projected condition. A plate 37 curved to be semi-circular in cross section mounts coextensively about and confines the dependent arcuate extremities of gussets 36 within framework 38 and extends from one plate 39 to the other. An elastic diaphragm 40 smoothly overlies the outer surface of plate 37 coextensive therewith, to have its peripheral portions sealed between the plate 37 and portions of framework 38 to form a sealed chamber 41 thereby which is airtight. Suitable conduits are connected for introduction of air to and exhaust of air from the enclosure 41.

Thus, there is a generally semi-cylindrical projection from the bottom of the lid for the cavity 2 which is a maximum at the end plates 39. With the lid closed, the portions of framework 38 mounting end plates 39 are adapted to nest in cavity 2 to its respective ends and thereby space the diaphragm 40 from the tray defined at the upper surface of steam jacket 5. Means defining shoulders 62 are provided to the undersurface of cap 33 to either side of the framework 38 which are adapted to seat to shoulders 4 in housing 1 when the lid is closed over the cavity 2, at which time the beams 31 are in a horizontal position.

An air cylinder 42 is suitably fixed within cap 33 between each pair of beams 31 to either end. Each cylinder houses a piston having a connected rod 43 projected through one end thereof parallel to the beams 31 and in the direction of their projected extremities. A bar 44 fixed at right angles to the projected extremity of rod 43 mounts parallel bars 45 at right angles to either end. The bars 45 bear in guides 47 fixed between flanges 34 and 35 to the sides of adjacent beams 31. The bars 45 extend beyond rod 43 and are reinforced by a further connecting bar 46 arranged parallel to bar 44, spaced inwardly from their projected extremities. The cylinder 42 may be suitably actuated on closing of the cavity 2 by the lid including cap 33 to advance the projected ends of bars 45 beyond the ends of the beams 31, through apertures in the dependent side of cap 33, and into recesses 48 defined in the vertically upstanding wall 49 of housing 1 adjacent the shoulder 4 remote from the shaft 9. Pins 50 and 51 are respectively fixed to project at right angles to the remote sides of bars 45 and through slots 52 in the vertical portions of adjacent I-beams 31. Limit switches 53 and 54 are fixed to the remote sides of each pair of beams 31 to have their actuating arms respectively forward of the pin 50 and rearward of pin 51 to respectively signal the locking and unlocking of the lid in a manner to be described.

A limit switch 55 is fixed within cap 33 between the respective pairs of beams 31 to have its activating arm project through an aperture in the shoulder 62 to the bottom of the cap which is remote from the shaft 9. The switch 55 is actuated by engagement with a shoulder 4 on closing the lid to energize air cylinders 42 and effect a clamping of the lid over cavity 2 in a manner to be described.

The projected extremities of bars 45 are bevelled at their upper surfaces to cooperate with wedges 56 fixed within the upper portions of recesses 48 in housing 1 to thereby effect a positive wedge of bars 45 when projected in a lid clamping position.

Figure 7:
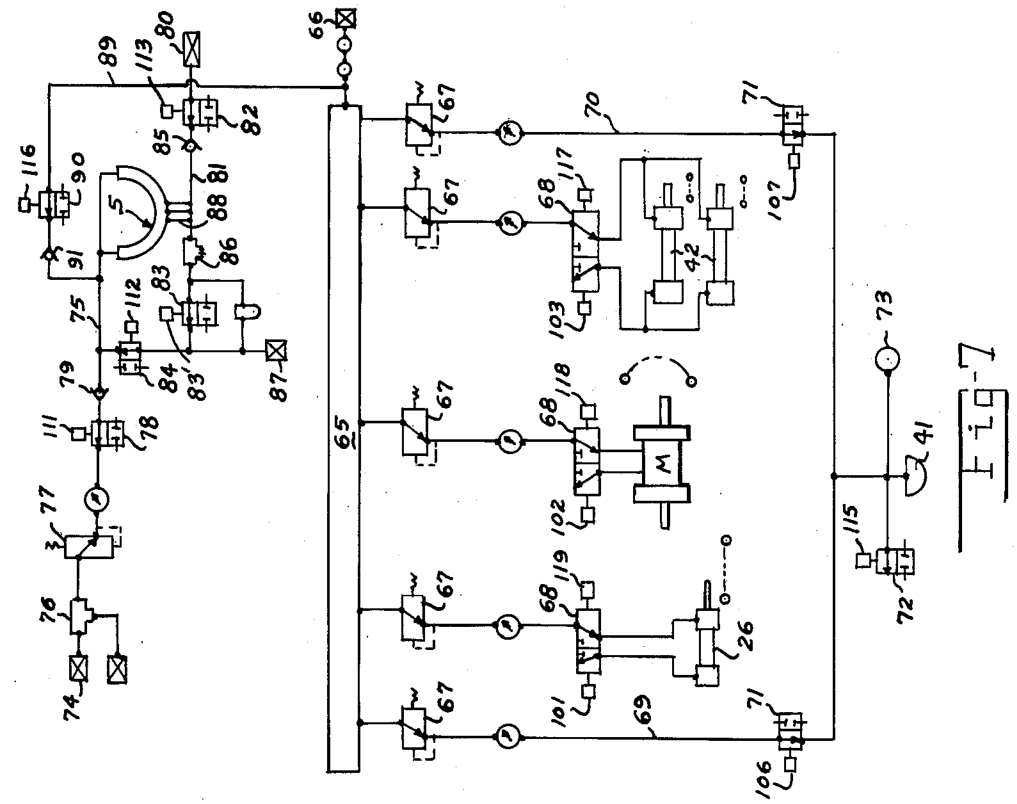
FIG. 7 is a flow diagram relating to the apparatus of FIG. 1.
Figure 8:
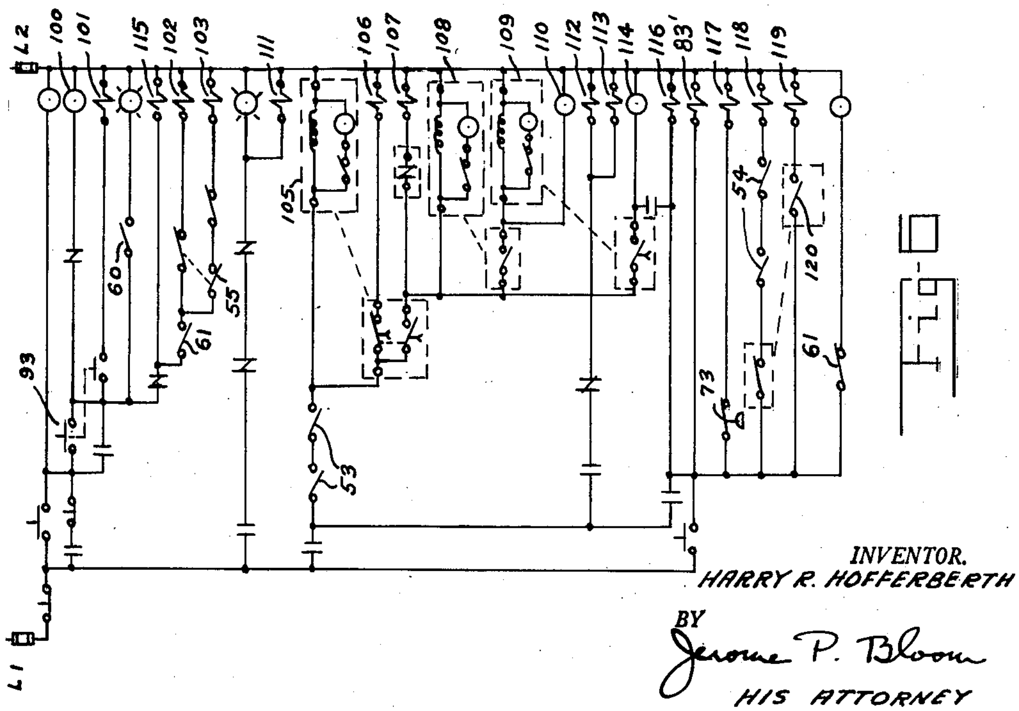

Referring to the flow diagram of FIG. 7 of the drawings, it may be there seen that a main air manifold 65 is provided in housing 1 adapted to receive air from a suitable source 66. Each of the air motors M, gear lock cylinder 26 and lid lock cylinders 42 are connected to manifold 65 through an air valve 68 and a pressure regulator 67. Lines 69 and 70 connected between manifold 65 and the enclosure 41 respectively provide for delivery of air to the enclosure under light and heavy pressures. A pressure regulator 67 and a solenoid control air valve 71 is interposed in each of the lines 69 and 70 between the air manifold and the enclosure 41. A solenoid controlled exhaust valve 72 and a pressure switch 73 are also operatively connected into the delivery line at the enclosure 41.

The steam jacket 5 is provided with a steam source 74 through a line 75 which has a strainer 76, pressure regulator 77, two way valve 78 and check valve 79 successively incorporated in the path of steam flow therein. A source of cooling water 80 provides for delivery of the same through a line 81, water inlet valve 82 and check valve 85 to the steam jacket. A drain valve 84 is interposed in a drain line between the steam line 75 and drain 87. Lines 88 provide for drain from jacket 5 and connect into the line 81. The drain 87 connects to the steam jacket through drain line 88 in a manner conventionally shown, a strainer 86 and by-pass valve 83 being interposed therebetween.

In addition a line 89 from the air source 66 connects into the steam jacket 5 through a valve 90 and a check valve 91 for purposes to be described.

FIG. 6 of the drawings shows a schematic of the circuit employed in controlling the apparatus above described. Its description can be best incorporated with reference to a cycle of operation of the disclosed apparatus.

At the beginning of a cycle, the lid portion of the aopparatus is open and the rod 27 engaged in gear 16. A steel tray 92 seats a printing shell with its printed surface down and back uppermost. A thin sheet of plastic is placed over the back of the shell and the elements so superposed positioned in the pocket defined at the upper surface of the jacket 5 by strips 6. At this time the steam valve 78 is opened and steam delivered into the jacket 5 through line 75.

An externally available start button 93 is pushed to initiate the machine cycle. This closes a line through relay 100 to energize solenoid 101 which operates its associated valve 68 to direct air to cylinder 26 to retract rod 27 from the gear 16. As this occurs, plate 27′ on rod 27 relieves switch 60 which closes and engages the switch 61 to close a circuit to energize the solenoid 102. As the switch 60 is relieved, it closes a circuit to energize a signal light externally of the machine to indicate the gear 16 is released. The solenoid 102, when energized, causes air to be directed to energize the motor M. The motor M drives shaft 17 and thereby shaft 9 through idlers 16 and 11 to initiate the closing of the lid. The bearings utilized in the drive system insure that friction is practically non-existent in the process. It should also be noted that there is a complete counterbalance between the hinge members 32 and counterweighted arms 21 in movement of the lid due to the fact that the hinge members are laterally coexistensive with the lid. This means that the lid operation is automatic, precise and free of strain.

As the lid which consists of the beams 31 and cap 33 is horizontally disposed to bridge and cover the cavity 2, the shoulders 62 seat to the shoulders 4. As this occurs, the projected arm of switch 55 is moved inwardly of the cap 33 to energize the solenoid 103. The solenoid 103 operates to direct air through its associated valve unit to the cylinders 42 to project the piston rods 43. The rods 43 move the lid clamp bars 45 into recesses 48 in housing 1 where they are wedged to effectively clamp the lid over the cavity 2.

At this point the semi-cylindrical projection to the bottom of the lid substantially fills the cavity 2 confining the tray 92 and superposed elements at their periphery. The expansible diaphragm 40 is thereby disposed immediately over and in spaced relation to the plastic covering the back of the printing shell.

As the bars 45 reach their lid clamping position, pins 50 thereon engage limit switches 53 to close a circuit energizing both timer 105 and a solenoid 106. The energized solenoid 106 operates the valve 71 in line 69 to provide delivery of air to the enclosure 41 under a light pressure sufficient to uniformly displace the diaphragm 40 from the plate 37. This provides that the diaphragm effects an initially light uniform bonding pressure applied to the plastic sheet and printing shell in the tray 92. It is to be remembered that the elements in the tray 92 have been under a constant heat due to the steam in the jacket 5. This facilitates the initial bonding action.

At the end of a short interval timed by the timer 105, the timer operates to open the circuit to the solenoid 106 and close a circuit to the solenoid 107 which opens the valves 71 in line 70 to provide for delivery of air to the enclosure 41 under a relatively heavy pressure which is transmitted through the diaphragm 40 to the plastic and printing shell therebelow for a predetermined interval to complete the molding or the bonding process under the influence of the steam heat in the jacket 5. The bridging hinge members 32 provide a complete restraint to insure diaphragm pressures are uniformly transmitted to the plastic thereunder.

The energizing of the solenoid 107 was accompanied by the energizing of a timer 108. As the timer 108 times out, the bonding or molding process is completed under the influence of heat and the timer 108 closes a circuit to initiate a third timer 109 and trips a relay 110. This causes solenoids 112 and 113 to be energized to respectively open the drain line between the steam line 75 and the drain 87 and open the valve 82 for delivery of cooling water to the steam jacket 5. Simultaneously the solenoid 111 operates to close the valve 78 in the steam line. At this point the heavy pressure is maintained on the superposed plastic and printing shell laminates while cooling water is circulated through the steam jacket 5 to cool the bonded laminates and complete an effective bond therebetween. The third timer 109 times out signalling the end of the cooling period and closes a circuit to trip a relay 114 to actuate solenoids 115 and 116. The solenoid 115 opens exhaust valve 72, to relieve the air pressure on the diaphragm 40. Simultaneously, the relay 114 causes the solenoids 112 and 113 to respectively shut off drain valve 84 from steam line 75 and the water inlet valve 82. The solenoid 116 opens the valve 90 in the line 89 to provide for a blast of air to enter the steam jacket 5 to blast the water out of the jacket and to drain.

When the pressure in the enclosure 41 drops to a level of roughly 5 to 10 pounds per square inch, the pressure switch 73 is closed to initiate the opening cycle of the machine. The solenoid 117 is actuated at this point to cause air to be delivered from the manifold 65 to retract the piston rods 43 in the cylinders 42 and thereby withdraw the bars 45 from their lid clamping engagement in the recesses 48 in the housing 1. As the bars 45 are retracted within the cap 33, the pins 51 hit the limit switches 54 to close a circuit energizing solenoid 118. The solenoid 118 functions to provide for delivery of air to the motor M to initiate the raising of the lid. As the lid reaches its uppermost position a switch 120 is closed thereby opening the motor actuating circuit and closing a circuit to energize solenoid 119 which causes air to be directed to the cylinder 26 to project rod 27 to the aperture 28 in the adjacent gear 16. The plate 27′ at this time opens the switch 60 and turns off the signal light which has indicated that the gear lock was disengaged. The switch 61 is of course opened at this time. Also, the steam valve is opened ready for the initiation of the operating cycle once more as the cycle start button is depressed.

The preceding provides a bonding of the plastic and printing shell in a laminated form which is very efficient and very effective, providing for uniform distribution of the plastic over the back of the printing shell so that the plate in use has maximum printing efficiency. It is believed obvious that the cycle is completely automatic and incorporates many safety and precision features which insures effective results. As mentioned previously, the type of hinge elements and counterweight relation of the arms to the hinge elements provides a balance of the lid in its operation which insures against malfunction and provides for precision positioning thereof in use. The effectiveness of the lid operation is enhanced by the fact that the gear control to effect a continuous balance thereof is practically friction free due to judicious use of bearings.

It may thus be seen that the invention provides a very effective and efficient automatically operating device for bonding laminations, particularly of metal and plastic, which requires minimum maintenance and supervision and results in obvious economy.

While the embodiment has been described with particular reference to a bonding or laminating operation, it may be equally applied to a molding operation. For example, in the case of preparation of a printing plate per se, a sheet mold may be placed in the tray defined by the steam jacket 5 with its type cavities uppermost. The plastic sheet to form the printing plate may be then superposed. Subjecting the superposed sheets to a cycle of operation similar to that previously described will result in the plastic of the upper sheet being simply and positively molded into the type cavities in the mold to precisely reproduce the required type thereon. On removal from the machine, the mold can be simply peeled from the printing plate thus formed.

From the above description it will be apparent that there is thus provided a device of the character described possessing the particular features of advantage before enumerated as desirable, but which obviously is susceptible of modification in its form, proportion, detail construction and arrangement of parts without departing from the principle involved or sacrificing any of its advantages.

While, in order to comply with the statutes, the invention has been described in language more or less specific as to structural features, it is to be understood that the invention is not intended to be limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. Bonding apparatus comprising, means defining a hollow chamber having a surface uppermost for nesting laminations thereon, means connected to said hollow chamber to selectively maintain heating or cooling fluid therein, means connected to said means defining said hollow chamber operative to bridge said surface in covering relation thereto and including means providing an expansible surface opposite said nesting surface and means operatively connected to said expansible surface for providing pressure therethrough to laminations thereunder having means connected to selectively vary the pressure operatively related to control said means for selectively maintaining steam or cooling fluid in said hollow chamber.

2. Bonding apparatus including, means defining a tray formed to slidably nest sheet means mounting laminations in superposed relation thereon, support means for said tray, beam-like members hinged on said support means to one side of said tray adapted to completely bridge said tray in covering relation thereto, a cover means for said tray on said beam-like members, lock elements mounted to said beam-like members adapted to automatically project and lock to said support means when said members bridge said tray in covering relation thereto, an expansible diaphragm on the bottom of said members having means operatively related to apply pressure therethrough to the laminations in said tray in automatic response to the locking of said lock elements to said support means and means operatively connected to said members to maintain a continuous counterbalance thereon during movement thereof to and from said tray.

3. Bonding or molding apparatus for backing printing plates comprising, support means, means defining a concave tray on said support means including a hollow chamber in immediately underlying relation to said tray and substantially coextensive therewith, said tray having a rigid surface uppermost to nest articles including a printing plate or its equivalent thereon with its print projected to said rigid surface and a sheet of plastic superposed, cover means hinged to said support means adapted to cover said tray and having means thereon displaceable to apply pressure to the printing plate through said plastic sheet and means connected therewith to automatically apply a selectively staged pressure to the plastic and the printing plate thereunder for selective intervals in response to the covering of said tray and means connected with said chamber providing a selectively timed delivery of heating and cooling fluid thereto operatively related to intervals of said staged pressure application.

4. Bonding apparatus comprising, support means including a tray section, a cover means operatively connected with said tray section, means operatively related to said cover means automatically operative to lock said cover means over said tray section on movement of said cover means thereto, said lock means having means operatively connected thereto to automatically displace a portion of said cover means to said tray section on assuming a locking position, means connected to said tray section for selectively applying heating or cooling fluid thereto coextensive therewith for timed intervals related to the displacement of said portion of said cover means and means operatively related to said displaceable portion of said cover means responsive on displacement thereof from said tray section to automatically unlock said cover means and displace it from said tray section.

5. Molding and bonding apparatus comprising, a support including means defining a tray for articles to be worked and a steam chamber in adjacent relation thereto, cover means connected to said support for movement to and from said tray, means connected with said cover means and said tray operative on movement of said cover means to said tray to automatically lock said cover means over said tray, an expansible diaphragm on the surface of said cover means most adjacent said tray, means operatively connected to respond to operation of said lock means to lock said cover means over said tray to first effect an application of light pressure through said diaphragm to articles on said tray for a timed interval and then establish an increased pressure for another timed interval, means connected to said chamber to maintain steam therein for at least a portion of said timed intervals having means connected to automatically evacuate the steam and apply cooling liquid in its place during said interval of increased pressure, means connected to automatically respond to completion of said second mentioned timed interval to evacuate the cooling liquid from said chamber and relieve the pressure on said diaphragm and means operated by relief of the pressure on said diaphragm to automatically unlock and lift said cover means.

6. Forming apparatus including a steam jacket defining a tray, support means for said steam jacket, a lid for said tray connected for displacement to and from a covering relation thereto, deformable means attached to and projectable from said lid to distribute a uniform pressure over articles on said tray, means connected to apply a staged pressure on the articles through said deformable means and means operatively connected to said means for applying said staged pressure to sequentially flow steam and a cooling fluid to said steam jacket and means activated on release of pressure on said deformable means to produce a blast of air evacuating the cooling fluid from the steam jacket.

7. Forming apparatus comprising a support means including means defining a tray for articles to be worked thereon and a steam chamber in adjacent relation thereto, cover means for said tray operatively connected to said support means, means operatively connected to said cover means to lock it in a position displaced from said tray, actuator means connected with said cover lock means, said lock means being automatically responsive to a signal from said actuator means to release said cover means for automatic movement to cover said tray, means in said cover means operating to lock it to said support means as it covers said tray, an expansible diaphragm on the surface of said cover means adjacent said tray, means responsive to locking of the cover means over said tray to first effect an application of light pressure through said diaphragm to articles on said tray for a timed interval and then establish an increased pressure for another timed interval, means connected to said chamber to maintain steam therein during at least a portion of said timed intervals, means connected to automatically drain the steam and supply cooling fluid to said chamber during said interval of increased pressure, means connected to limit the supply of cooling fluid and effect an air blast to clear it from said chamber, means connected to relieve pressure on said diaphragm and means adjacent and operable by said diaphragm as the pressure thereon is relieved to automatically effect an unlocking and raising of said cover means, said means for locking said cover means in a position displaced from said tray responding and rendered operable by the raising of said cover means to lock it in said displaced position.

8. Bonding apparatus including, support means, means providing a rigid surface uppermost on said support means adapted to receive thereon articles to be bonded in relatively superposed relation, a lid operatively related to said support means adapted to cover said receiving means, means connected to lock said lid in fixed position over said receiving means in response to a disposition thereof in covering relation thereto, means defining a resilient deformable surface on said lid and forming a chamber therewith adjacent said receiving means, means operating in response to the fixed positioning of said lid relative said receiving means to introduce to said chamber fluid under a predetermined pressure for a first interval and to automatically increase the pressure for a second interval to supply a selectively staged pressure through said deformable surface to the articles thereunder and means in connection with said chamber operating in response to a predetermined relief of the fluid pressure therein to release said lid from its fixed position and displace it from said rigid surface.

9. Bonding apparatus including, a steam jacket defining a tray for receiving articles thereon for bonding in superposed relation, cover means operatively related to said jacket for displacement to and from a covering relation to said tray, deformable means on said cover means to its side adjacent said tray, means responsive to the displacement of said cover means to said tray to first effect, through said deformable means, an initially light, uniform pressure to articles on said tray for a first predetermined interval and then automatically increase the pressure for a second predetermined interval to provide a staged bonding of the articles and means connected with said jacket to maintain fluid therein in a condition to uniformly heat the articles during said first interval and at least a portion of said second interval and means responding to a predetermined interval of heating the articles to evacuate the heating fluid and replace it with a cooling fluid.

10. Bonding apparatus including, means for immediately confining layers of material to be bonded in superposed relation, immediately adjacent surfaces of said means providing a rigid surface to one side of the layers and a resilient, expansible surface to the opposite side, means operatively connected to apply a light pressure to said layers through said resilient surface for a first predetermined interval, means automatically responsive to the completion of said interval to effect an application of a relatively heavy pressure to the layers through said resilient surface for a second predetermined interval thereafter and means connected to provide a selectively timed delivery of heating and cooling fluid to one of said confining means operatively related to the occurrence of predetermined portions of said intervals of pressure application.

11. The structure as set forth in claim 10 characterized by means responsive to a predetermined relief of the pressure on said layers to cause a separation of said confining means relative thereto.

References Cited in the file of this patent

UNITED STATES PATENTS

| | | |
|---|---|---|
| 1,628,057 | Nitchie | May 10, 1927 |
| 1,909,444 | Worrall | May 16, 1933 |
| 1,956,168 | Fix et al. | Apr. 24, 1934 |
| 2,355,420 | Carter | Aug. 8, 1944 |
| 2,646,105 | Langer | July 21, 1953 |
| 2,671,493 | Olson | Mar. 9, 1954 |
| 2,686,552 | Faeber et al. | Aug. 17, 1954 |
| 2,725,091 | Miner et al. | Nov. 29, 1955 |
| 2,895,533 | Hefler et al. | July 21, 1959 |
| 2,960,147 | Ferrell | Nov. 15, 1960 |
| 3,014,520 | Myers | Dec. 26, 1961 |